Figure 3:
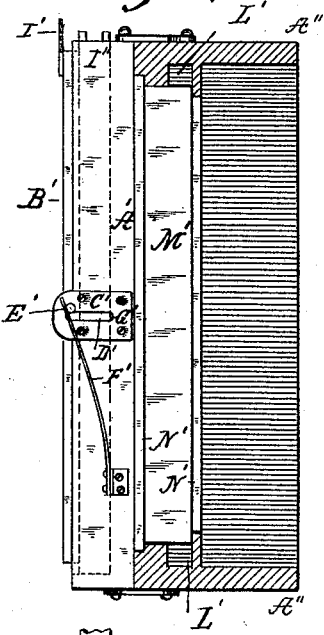

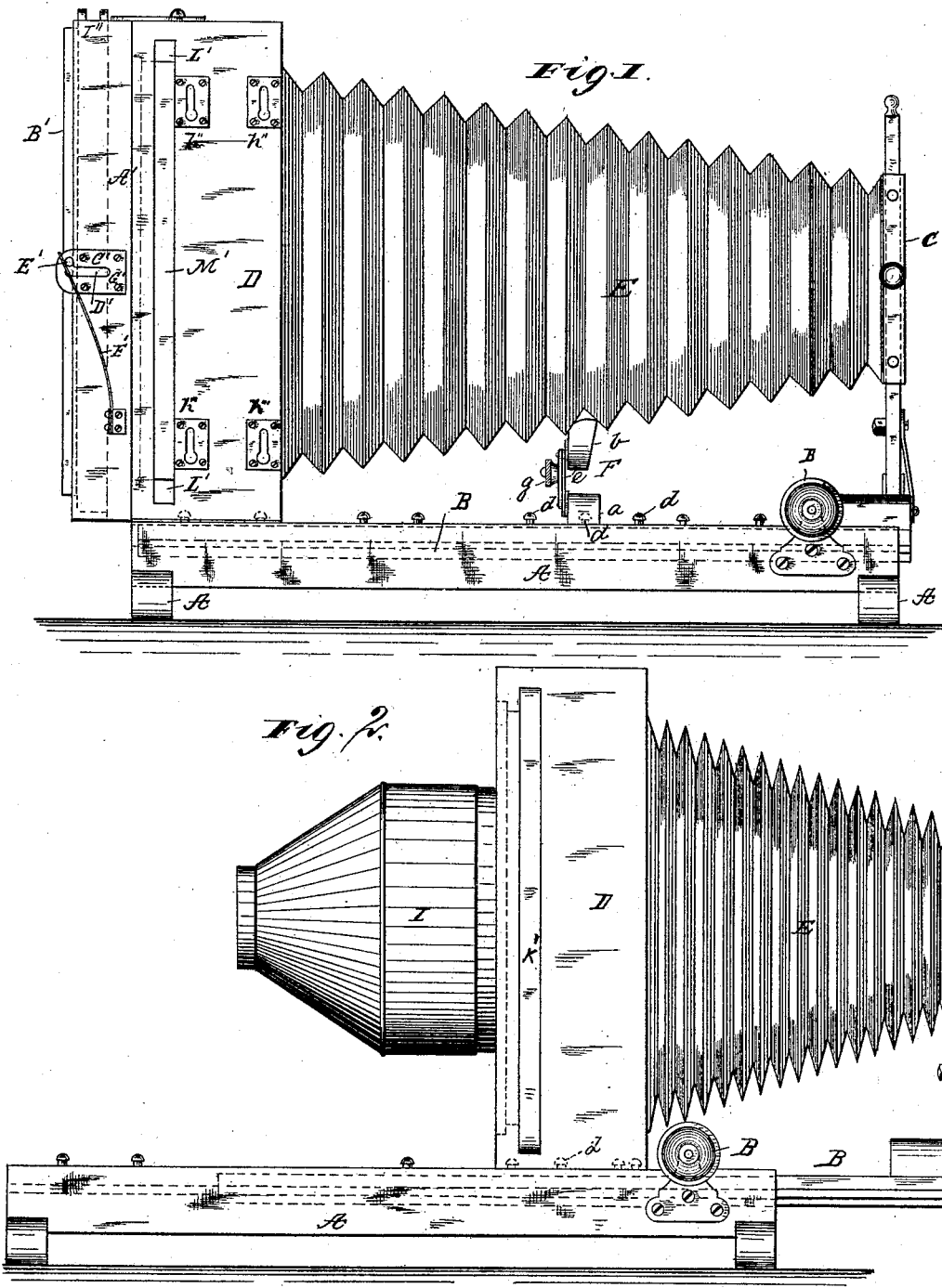

(No Model.) 3 Sheets—Sheet 2.

W. H. LEWIS.
PHOTOGRAPHIC APPARATUS.

No. 379,964. Patented Mar. 27, 1888.

WITNESSES
John H. Ives.
C. Doltire.

INVENTOR,
William H. Lewis,
BY Phillips Abbott his
Attorney.

(No Model.) 3 Sheets—Sheet 3.

W. H. LEWIS.
PHOTOGRAPHIC APPARATUS.

No. 379,964. Patented Mar. 27, 1888.

WITNESSES.
John H. Ives.

INVENTOR.
William H. Lewis
BY Phillips Abbott his
Attorney.

UNITED STATES PATENT OFFICE.

WILLIAM H. LEWIS, OF BROOKLYN, ASSIGNOR TO E. & H. T. ANTHONY & COMPANY, OF NEW YORK, N. Y.

PHOTOGRAPHIC APPARATUS.

SPECIFICATION forming part of Letters Patent No. 379,964, dated March 27, 1888.

Application filed October 14, 1887. Serial No. 252,342. (No model.)

*To all whom it may concern:*

Be it known that I, WILLIAM H. LEWIS, a citizen of the United States, and a resident of Brooklyn, in the county of Kings and State of New York, have invented certain new and useful Improvements in Photographic Apparatus, of which the following is a specification.

My invention relates to improvements in photographic cameras; and it consists, first, in new and useful devices for the support of the bellows; second, in devices for supporting and properly locating the ground-glass plate at the rear of the camera; third, in devices whereby the same apparatus may be used both as an ordinary photographic camera for taking pictures and also a projecting camera.

In the drawings the same reference-letters indicate the same parts in all the figures.

Figure 4:
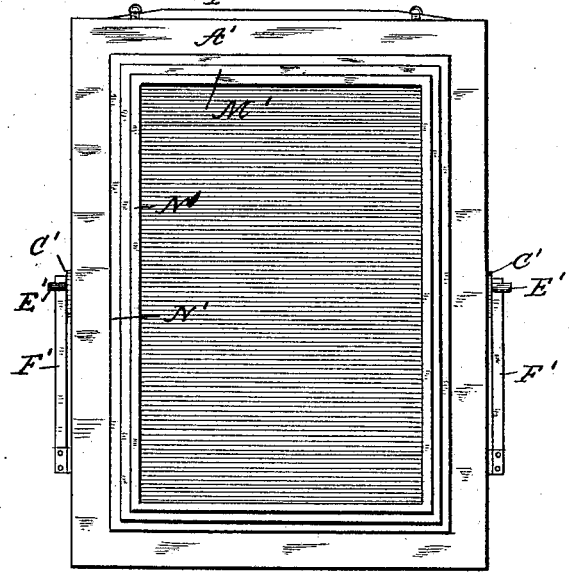
Figure 5:
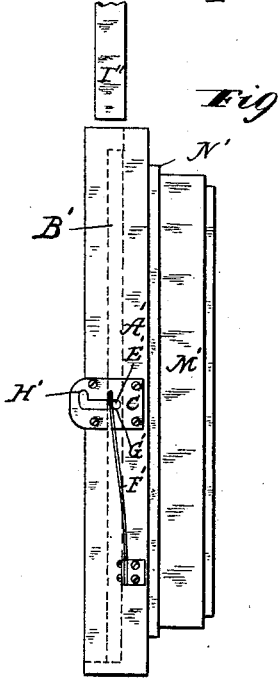
Figure 6:
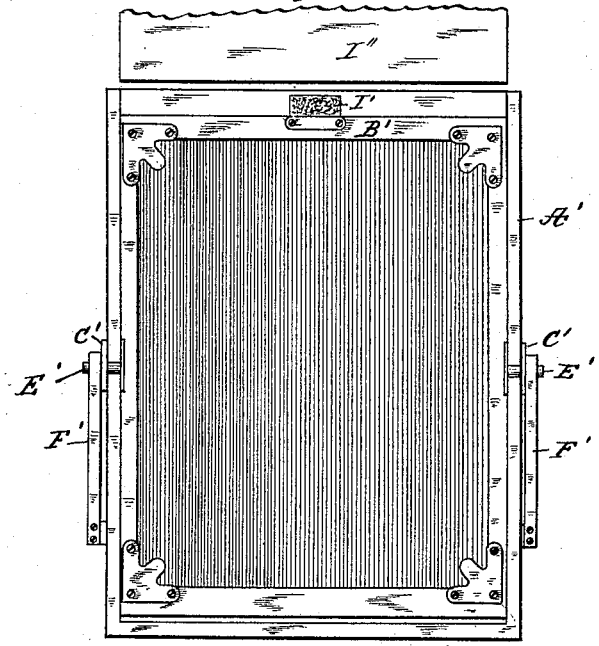
Figure 7:
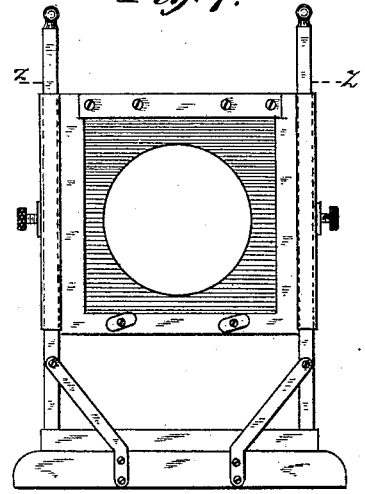
Figure 8:
Figure 9:
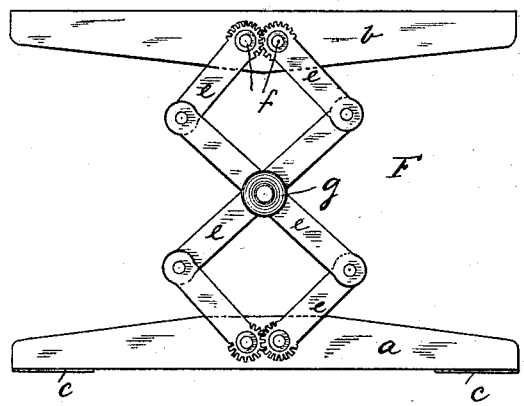
Figure 10:
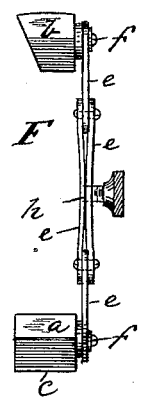

Figure 1 illustrates a side plan view of the apparatus when in use as an ordinary camera, showing the ground-glass plate, and also the bellows-supporter, in position. Fig. 2 illustrates a side plan view of the apparatus when in use as a projecting camera, the lamp being removed, however. Fig. 3 illustrates a side view of the rear portion of camera-box in section and the removable frame which supports the ground-glass frame and the plate-holding frame in place. Fig. 4 illustrates a front view of the parts shown in Fig. 3, the rear part of the camera-box being removed and showing the light-excluding flange. Fig. 5 illustrates a side view of the ground-glass frame in the position it occupies in the rear removable frame when the plate-holder is removed. Fig. 6 illustrates a rear view of the parts shown in Fig. 5. Fig. 7 illustrates a front view of the forward lens-holding frame. Fig. 8 illustrates a top view of the parts shown in Fig. 10. Fig. 9 illustrates a side view of the bellows-supporting device. Fig. 10 illustrates an endwise view of the parts shown in Fig. 9.

A is the base or main supporting-frame of the apparatus. It is provided with the usual rack and pinion, B, for longitudinally moving the lenses, and also with the usual lens-supporting frame, C, plate-supporting frame D, and bellows E.

The first part of my invention consists in the bellows-supporter F. (See Figs. 1, 9, and 10.) It consists of a lower transverse bar, $a$, and an upper transverse bar, $b$. The bar $a$ is provided on its under side with slotted metallic plates or their equivalent, $c$, which engage with a series of upwardly-extending knobs, $d$, on the base-frame A, whereby the device is held in position on the base-frame, being shifted from place to place along the main frame, as described, by engagement with the several pairs of knobs $d$, differently located on the base A. The bars $a$ and $b$ are connected by expansible or metallic strips $e\ e$, &c., which are connecting-plates pivoted to the said bars, respectively, at $f\ f$, &c. The adjoining ends of these strips are preferably but not necessarily formed into toothed segments of circles, as shown, which gear into each other. Their construction secures parallelism between the bars $a$ and $b$.

$g$ is a set-screw, which may be used to give the needful friction to the expansible strips by binding them together at $b$. This set-screw is not essential, because the stiffness of the joints will ordinarily maintain the supporter in the desired position; but it is desirable, because after long use the joints are apt to become worn and loose.

The operation of the bellows-supporter is obvious. It is placed on the base-frame A at such point as may be desired, and the bellows are elevated or depressed by the vertical movement of the forward lens-holding frame, as may be necessary to take the desired picture. The supporter is then adjusted vertically beneath the bellows by the extension or collapse of the jointed strips $e$, as may be needful to bring the upper bar, $b$, against the under side of the bellows, thus properly supporting the same.

The second part of my invention relates to the devices for supporting the ground-glass plate at the rear of the camera.

A' (see Figs. 3, 4, 5, and 6) is the plate-supporting frame, which fits into the rear part of the camera, (marked A'',) and B' is the frame which holds the ground glass. It enters into the rear of the frame A', as usual.

C' are small pieces or plates, preferably of metal, which are slotted with a bayonet-joint slot, as at D', Figs. 3 and 5. They are fastened to the side of the frame A'. The frame B' has pins E' projecting from each side thereof, which enter and easily slide through the slots D' in the metallic pieces C'.

F' are springs fastened to the frame A' and on each side thereof. The free ends of these springs bear against the ends of the pins E' and tend normally to press them and the ground-glass frame B', to which they are attached, inwardly toward the frame A'. The adjustment of these parts is such that when the pins E' are at the forward end, G', of the slots then the ground glass will occupy exactly the position of the plate on which the picture is to be taken; but when the frame B' has been pulled rearwardly somewhat and slightly lifted, so that the pins E' enter the bayonet-joints H' of the slots D', then the ground-glass frame will be separated from the rear of the frame A' somewhat more than the thickness of the plate-holder I'', and it (the plate-holder) may then be dropped into its place between the frame B' and the rear of the frame A', and will remain there loosely until the pins are disengaged from the bayonet-joints H'; and then the ground-glass frame will be pressed forward firmly against the plate-holder by the springs F'. It is obvious that the bayonet-jointed slots may be made in the side of the frame itself, instead of in the metallic pieces or plates C', if preferred.

The operation is as follows: To obtain the focus, the ground-glass frame is adjusted so that the pins E' are at the most forward end of the slots D', as in Fig. 5, and it is held there by the springs F'. As soon as the proper focus has been secured, the upper edge of the ground-glass frame is pulled rearwardly by laying hold of the pull-strap I' on its upper edge. Any equivalent means may be employed instead of this pull-strap for conveniently manipulating the ground-glass frame. The rearward movement of the upper edge of the ground-glass frame causes its lower edge, which rests against the frame A', to act as a fulcrum, and thus the springs are put under tension by the pressure of the pins E', which move rearwardly through the slots D'. When the pins reach the bayonet-joint H', the frame B' is slightly lifted, so that the pins shall enter and be held in the bayonet-joints by the tension of the springs. When the frame B' is in this position, the plate-holder I'' is dropped into position between the frame B' and the frame A'. The frame B' is then pressed downwardly again until the pins pass out of the bayonet-joints and become coincident with the straight part of the slots D'. The springs then press the ground-glass frame B' firmly against the plate-holder, and it in turn firmly against the rear of the frame A'. Thus all the parts are held in proper position for taking the picture. After the picture is taken, the plate-holder may be drawn upwardly and away from the camera, the springs then pressing the ground-glass frame into its original position against the rear of the frame A', preparatory to again focusing, if desired.

The third part of my invention relates to special construction of certain parts of the apparatus, whereby it may be interchangeably used and as an ordinary camera-box for taking pictures, and also as a projecting camera. The mechanism whereby the rear part of the camera D may be shifted forwardly on the base-frame, thus effecting the change from a picture-taking camera, as shown in Fig. 1, to a projecting camera, as shown in Fig. 2, is well understood, and may be made in any preferred manner.

The forward part of the lamp used in connection with the apparatus when arranged for a projecting camera is shown at I, Fig. 2. The frame which holds the negative is shown at K', and L' is the slot in the side of the box D through which it is introduced into the apparatus in the line or field of the lenses. In order that this slot may be closed light-tight when the apparatus is used as a picture-taking camera, a forwardly-projecting ledge or flange, M', is added to the front side of the frame A', which receives the plate-holder and the ground-glass frame; and on the front edge of this flange, and also, if desired, at its rear edge, I prefer to form one or more tongues or rabbets, N', which engage with corresponding recesses in the box D. The flange M' is sufficiently wide to cover the slot L'. By these means, when the negative-holding frame K' is removed and the frame A' is inserted, the box D' is rendered light-tight.

In order that the apparatus may be used on its side, if necessary, I provide the slotted plates h'' h'', &c., on the side of the rear part of the box in addition to those on the lower edge thereof, and the forward end of the bellows is attached to the front lens-holding frame, C, by a ring or equivalent device, which may be rotated on the lens-frame.

It will be obvious to those skilled in this art that many changes may be made in the details of construction shown by me without departing from my invention.

I claim—

1. The combination, in a bellows-supporter, of an upper and a lower supporting-piece, united by extensible connecting devices, substantially as described.

2. The combination, in a bellows-supporter, of an upper and a lower supporting-piece, united by extensible pivoted strips, the ends whereby are geared into each other, as and for the purposes set forth.

3. The combination, in a bellows-supporter, of an upper and a lower supporting-piece, united by extensible connecting-strips, and a set-screw, whereby friction may be applied to the movable parts, as and for the purposes set forth.

4. The combination, in a bellows-supporter, of an upper and a lower supporting-piece, united by extensible connecting devices, and slotted plates on the under side of the lower supporting-piece, which engage with corresponding devices on the frame of the apparatus, whereby the supporter will be held firmly in place, as and for the purposes set forth.

5. The combination, in a photographic camera, of a spring-controlled ground-glass plate and double supports for the plate, against which it is held by spring action, whereby the plate will be supported and held in two positions, one of them coincident with the plate on which the picture is to be taken and the other sufficiently rearward thereof to allow of the insertion of the plate-holder, substantially as set forth.

6. The combination, in a photographic camera, of a spring-controlled ground-glass plate and double supports for the plate, against each of which it is supported and held by spring action, whereby the plate will be supported in two positions, one of them coincident with the plate on which the picture is to be taken and the other sufficiently rearward thereof to allow of the insertion of the plate-holder, the parts being constructed and arranged in such manner that upon the release of the ground-glass plate from its said rearward resting-place it will be pressed against the plate-holder by spring action, substantially as and for the purposes set forth.

7. The combination, in a photographic camera, of a plate-holder-supporting frame, A', ground-glass frame B', having pins E', plates C', having bayonet-jointed slots D', and springs F', substantially as and for the purposes set forth.

8. The combination, in a photographic camera, of a plate-holder-supporting frame, A', ground-glass frame B', having supporting-pins E', plates C', having guides for the pins E', and springs F', substantially as and for the purposes set forth.

Signed at New York, in the county of New York and State of New York, this 5th day of October, A. D. 1887.

WILLIAM H. LEWIS.

Witnesses:
   JOHN H. HEATH,
   R. A. ANTHONY.